United States Patent [19]

Suzuki et al.

[11] 3,969,153

[45] July 13, 1976

[54] METHOD OF MANUFACTURING A STAINLESS STEEL BOILER TUBE WITH ANTICORROSIVE COATING

[75] Inventors: Katsumi Suzuki, Hitachi; Toshio Kawakami, Mito; Osamu Asai, Hitachi, all of Japan

[73] Assignees: Hitachi, Ltd.; Babcock-Hitachi Kabushiki Kaisha, both of Japan

[22] Filed: Jan. 15, 1975

[21] Appl. No.: 541,115

[30] Foreign Application Priority Data

Jan. 18, 1974  Japan.............................. 49-7847

[52] U.S. Cl............................... 148/6.35; 148/31.5; 122/DIG. 13
[51] Int. Cl.² ........................................... C23F 7/04
[58] Field of Search............................. 148/6.35, 6.3

[56]   References Cited
UNITED STATES PATENTS
3,705,057  12/1972  Kelp................................ 148/6.35

OTHER PUBLICATIONS

Bittel et al., Corrosion, vol. 25, (1), 1969, pp. 7–12.
McCullough et al., Preprint of Paper Presented at the Thirty-second Annual Convention Am. Soc. for Metals, Chicago 1950, pp. 1, 12, 13, 17.

*Primary Examiner*—Ralph S. Kendall
*Attorney, Agent, or Firm*—Craig & Antonelli

[57]   ABSTRACT

A boiler tube and a method for manufacturing the same are disclosed in which an inner surface of the boiler tube used in the center of a high-temperature, high-pressure boiler is formed with a spinel layer consisting of an oxide of iron, chromium and nickel, which is exposed. The specific method of the manufacture is that after the boiler tube is brought into contact with high temperature steam, a magnetic iron ($Fe_3O_4$) layer produced on the inner surface is removed.

20 Claims, 11 Drawing Figures

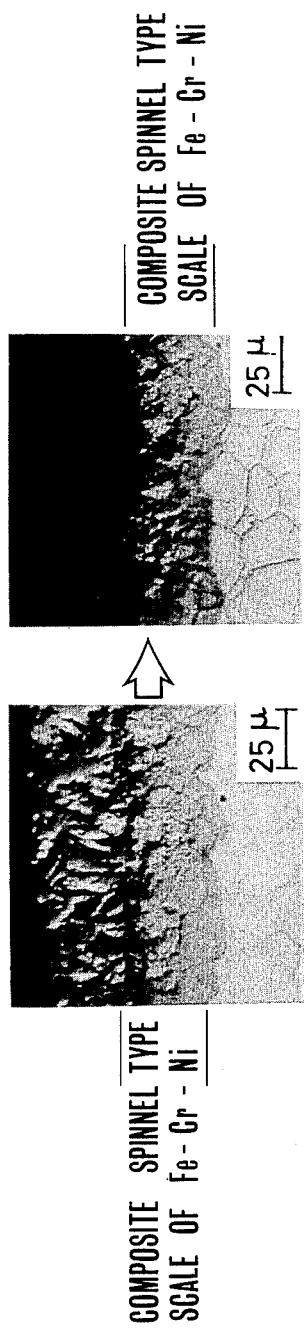
FIG. 1
FIG. 2
COMPOSITE SPINNEL TYPE SCALE OF Fe-Cr-Ni
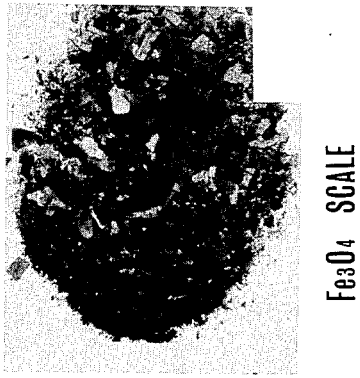
FIG. 3
$Fe_3O_4$ SCALE XMA(1) — PART OF THICK INNER LAYER | PART OF THIN INNER LAYER | XMA(2) EXPOSED PART OF MATRIX MATERIAL

INNER LAYER SCALE
MATRIX MATERIAL

OUTER LAYER SCALE
INNER LAYER SCALE
MATRIX MATERIAL

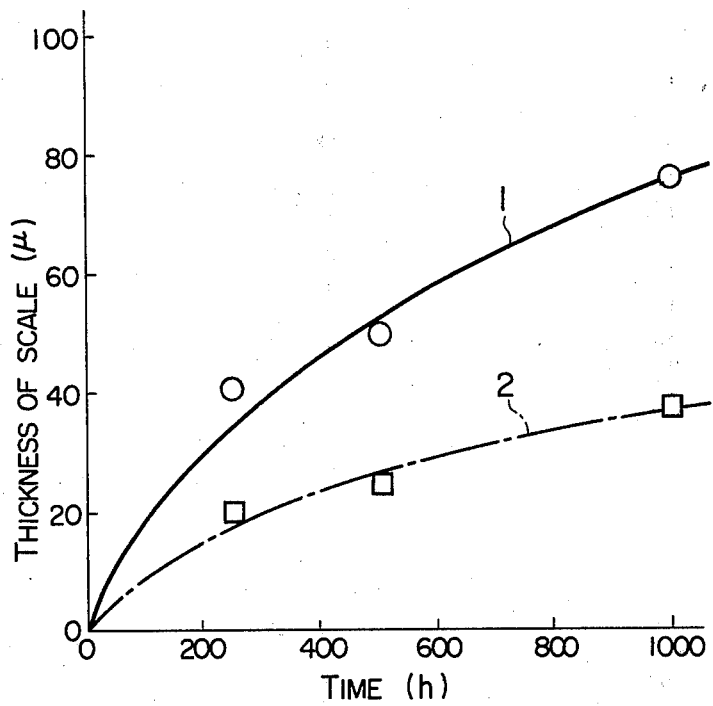
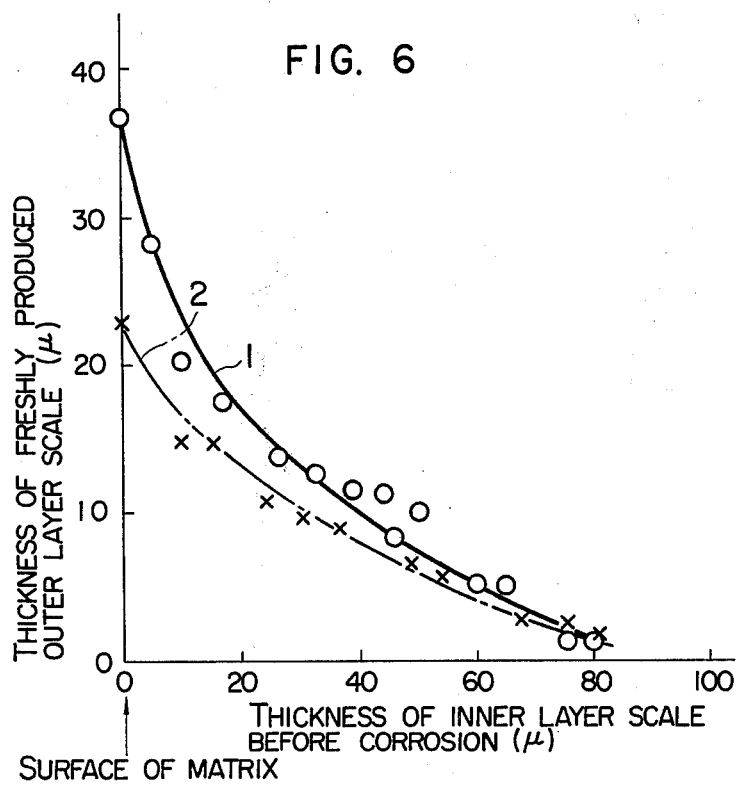

METHOD OF MANUFACTURING A STAINLESS STEEL BOILER TUBE WITH ANTICORROSIVE COATING

BACKGROUND OF THE INVENTION

1. Field of the Invention

The present invention relates to a stainless steel boiler tube having an anticorrosive coating, which is resistive to the attack by high-temperature, high-pressure steam, formed on at least an inner surface of the tube, and a method for manufacturing the same.

2. Description of the Prior Art

Recently, there has been a rapid trend of the elevation of the temperature and the increase of the pressure and the capacity of a boiler for a power station and hence the elevation of the temperature at the center of the boiler. Thus, a higher corrosion resistance than in the prior art boiler has been required. For this reason, a boiler tube of stainless steel has been used in high-temperature section of the boiler.

Even with such a stainless steel boiler tube, the corrosion occurs on the inner surface of the tube when high-temperature, high-pressure water or steam is passed therethrough. The resulting scale will be exfoliated when the thickness thereof exceeds a predetermined value. The inventors of the present invention have found that such exfoliating would not occur during the contact with the high-temperature, high-pressure steam but would occur when the temperature of the boiler tube was lowered to a room temperature to about 200°c while the operation of the boiler was stopped for the inspection of a turbine. When the operation of the boiler is stopped by a reason not associated with the inspection of the boiler, it is usually re-started without inspection. On the other hand, the accumulation of the exfoliated scales cannot be detected unless the boiler tube is cut. If the boiler is re-started while the exfoliated scales are accumulated, the tube will be overheated, which will lead to an accident, i.e. the tube bursts.

As an approach to overcome the above difficulty, it has been suggested to air-oxidize the inner surface of the tube to form an oxide coating on the inner surface to suppress the corrosion. According to that approach, ferrous sesquioxide which is referred to as red with rust, magnetite ($Fe_3O_4$) which is referred to as black with rust, ferrous suboxide and composite oxide of chromium, nickel and iron are formed in layers in the above order in the direction of the depth. Of those layers, only the composite oxide layer is effective to prevent the corrosion. However, in the above approach, the formation rate of the effective anticorrosive coating is low, and the adherence to the metal surface is poor and a sufficient anticorrosion effect cannot be provided because of the thin composite oxide layer. When water sufficient to meet the requirement for the operation of the boiler is passed through the stainless steel boiler tube having the above oxide coating, the rust primarily consisting of $Fe_3O_4$ grows and eventually the rust will be peeled. Thus, as in the previous description, the scales accumulate at the bottom of the boiler tube, which leads to a break in the boiler tube. In order to prevent the break, it has been required in the past to cut portions of the boiler tube to mechanically remove the rusts accumulated at the bottom of the boiler tube or to provide a valve seat on the tube from which chemicals are injected to chemically remove the accumulated rust. However, both removal methods require must cost and much time. In addition, the mechanical removal method cannot completely remove the scales while the chemical removal method remove the effective anticorrosive coating as well.

SUMMARY OF THE INVENTION

It is a primary object of the present invention to prevent the formation of the scale, which will be exfoliated during the operation of the boiler, on at least inner surface of the stainless steel boiler tube.

It is another object of the present invention to provide a stainless steel boiler tube having a fine structured anticorrosive coating formed on at least inner surface of the boiler tube.

It is other object of the present invention to provide a method for forming only effective anticorrosive coating on at least the inner surface of the stainless steel boiler tube.

It is still other object of the present invention to provide a method for forming the anticorrosive coating which allows concurrent heat treatment of the stainless steel boiler tube.

The above and other objects, features and advantages of the invention will become more apparent from the following detailed description of the preferred embodiments of the invention when taken in conjunction with the accompanying drawings.

BRIEF DESCRIPTION OF THE DRAWINGS

FIG. 1 shows a cross section of an oxide layer in the stainless steel boiler tube formed according to one embodiment of the present invention.

FIG. 2 shows a cross section of the oxide layer of FIG. 1 but with an outer oxide layer thereof being removed.

FIG. 3 shows an external view of the outer oxide layer exfoliated from the oxide layer of FIG. 1.

FIG. 5 shows curves illustrating the relation of the corrosion time of the boiler tube of the present invention to the rate of scale formation.

FIGS. 6 and 7 shows curves illustrating the relation of the thickness of the inner oxide layer of the boiler tube of the present invention to the thickness of the outer scale layer formed after the corrosion.

DESCRIPTION OF THE PREFERRED EMBODIMENTS

Figure 4A:
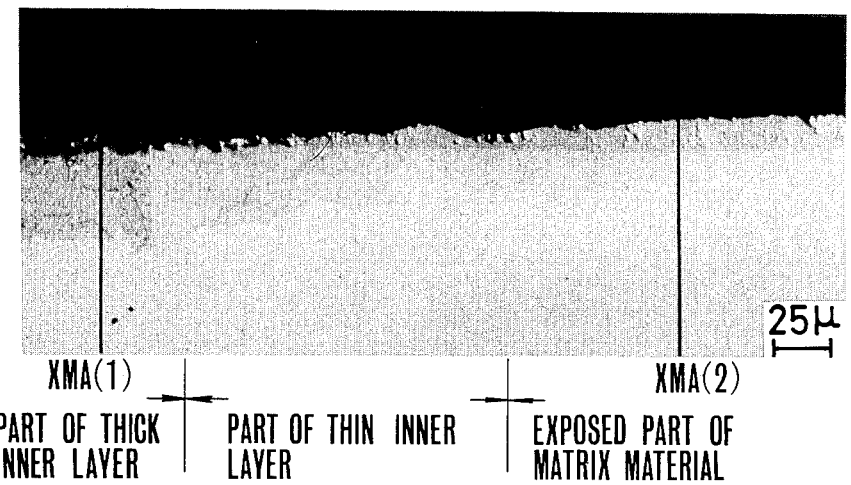
FIG. 4 shows a cross section illustrating the generation of the scales for different thickness of inner oxide layers formed in the boiler tube according to another embodiment of the present invention, and an element distribution curve obtained by X-ray micro-analysis of the cross section.

After extensive study on the structures of the scales formed by the oxidation of the stainless steel boiler tube in high-temperature, high-pressure steam, the inventors of the present invention have found that of the scales formed in the stainless steel boiler tube a spinel layer which was a composite oxide layer of nickel, iron and chromium was structurally fine, and that the formation of the detrimental outer $Fe_3O_4$ layer could be considerably suppressed by making the thickness of the composite oxide layer sufficiently thick.

The present invention is thus characterized by a method for manufacturing the stainless steel boiler tube having an exposed, anticorrosive coating formed over substantially entire surface of at least inner surface of the boiler tube, said anticorrosive coating being the spinel layer consisting of the composite oxide layer of iron, chromium and nickel.

The boiler tube that can be used in the present invention is made of a stainless steel primarily consisting of iron, nickel and chromium. The proportion of these metals are; chromium 5–25% by weight, nickel 3–25% by weight and iron the balance. 0.5–5% by weight of molybdenum and 0.2% by weight or more of added elements may be included. Although an iron-chromium stainless steel is available, the stainless steel the chromium content of which is less than 9% by weight is not suitable to be applied by the present invention for the reason described later. The stainless steel boiler tube used in the present invention may be either new one or may have red with rust formed. Since the red with rust has a rough structure and hence permits full penetration of the oxygen ions, the tube having the red with rust is considered to be identical to the new one.

Particular examples of the stainless steel are; 18 Cr stainless steel, 25 Cr stainless steel, 18 Cr – 8 Ni stainless steel, 9 Cr – 1 Mo stainless steel, 22 Cr – 12 Ni stainless steel, 13 Cr stainless steel and 25 Cr – 20 Ni stainless steel.

According to the present invention, the anticorrosive layer is formed by the heat teatment under the steam environment. Specifically, heating is effected in the following manner:

1. Supply water to the boiler tube and heat it above the critical pressure and the critical temperature of the water.
2. Pass the steam in and around outer surface of the boiler tube to heat it.
3. Pass the steam in the boiler tube and heat the tube externally.

Preferably, the pressure of the steam is above the atmospheric pressure. Below the atmospheric pressure, the rate of the formation of the spinel layer is low and there is a risk of the admixture of spurious gases. When water is supplied to form the anticorrosive layer, the pressure of 200 – 300 kg/cm$^2$ may be selected. The heating temperature may be 600 — 1,100°C. When water is supplied into the boiler tube to form the spinel layer, the heating temperature may be about 550°C -650°C. To obtain the composite oxide of sufficient thickness to provide desired anticorrosion effect at 600°C, 500 hours will be required while at 1,000°-1,100°C 1 hour will be required. Above 1,200°C, the stainless steel is modified and loses its inherent property.

Under the steam environment above 500°C, or by supplying water and heating above 550°C under the pressure of 200 kg/cm$^2$ or more, the spinel layer is formed. The spinel layer mostly grows to have a predetermined crystallization direction from the matrix surface of the boiler tube. The composition includes the oxide comprising at least iron, chromium and nickel, which is arranged to present the spinel structure. The reason for the formation of such spinel layer is guessed as follows: Of the elements constituting the stainless steel the richest element at high temperature is iron, which has a higher mobility than those of nickel and chromium. When the steam is brought into contact with the stainless steel, only the oxygen in the water molecule substitutes with iron. When oxygen or air is used the oxygen remains in molecular form and hence it hardly substitutes with iron. When the oxygen left from the water molecules substitutes with iron, the iron is pushed out of the stainless steel by the amount corresponding to the substitution to form $Fe_3O_4$. As the oxygen diffuses by the contact of the steam, the corresponding amount of iron moves toward the stainless steel surface and oxygen also couples with nickel and chromium, and the spinel structure of iron, nickel and chromium is eventually formed. When the depth of the spinel layer is shallow, oxygen may be readily substituted, but as the depth increses the range of oxygen also increases so that the movement of iron reduces, which results in the decrease of the formation of $Fe_3O_4$ until the formation is substantially cesed. In fact, the spinel layer grows on inner side of the surface of the stainless steel while the $Fe_3O_4$ grows on outer side of the surface.

Since the spinel layer is finally in the form of composite compound of metal elements and oxygen, it might be considered that it could be heat-treated in an oxygen gas atmosphere. However, the allowable limit of oxygen in the steam is 1 –2% at most, and above this limit the reaction rate is governed by oxygen so that not only the rate of formation of the spinel layer is lowered but a uniform film effective to the anticorrosion effect cannot be formed at the deepest area of the layer, as stated above.

The oxide layer formed by the heat treatment under the stem environment is in the form of dual layer on the stainless steel, the inner layer thereof being the spinel layer while the outer layer being $Fe_3O_4$ layer. According to this method, the rate of formulation of the spinel layer is high and the resultant spinel layer is of fine structure and has a good adherence property. It is considered that good adherence property is obtained because the boundary of the spinel layer and the stainless layer is not definite when viewed microscopically but both layers are intermingled in a complex manner.

As mentioned above, the oxide layer consists of two layers, of which outer $Fe_3O_4$ layer is relatively easily exfoliated. If this layer is left, it will accumulate in the boiler tube to cause the accident. Therefore it should be removed. Thus, in the present invention, only the inner spinel layer is used as the anticorrosive coating.

In exfoliating, the boiler tube should be cooled to facilitate the exfoliating work. The cooling is conducted down to 200°C to a room temperature. There is no particular relation between the cooling rate and the exfoliate. The exfoliating will occur when the tube is cooled to around room temperature. However, when the starting temperature of cooling is below 600°C, no exfoliating occurs even if the cooling is conducted to room temperature. This relation will be described more fully later on. Thus, when the steam treatment has been carried out above 650°C, the outer $Fe_3O_4$ layer is exfoliated when the temperature of 200°C to room temperature is reached, but when the $Fe_3O_4$ layer of the scale formed below 600°C is to be exfoliated, it must be heated above 650°C before it is cooled. Conventional cooling method may be used to accomplish the exfoliating. By way of example, air cooling, oven cooling, blow of cooling gas, air or steam, or water cooling may be used. The order of the cooling rate for the above methods is oven cooling, air cooling, air blow and water cooling, in ascending order.

When the cooling is started from 1010°–1,121°C, it means that the solid solution treatment of the stainless steel is conducted in accordance with the AISI Standard. Therefore, if the boiler tube has been formed in the shape of boiler plumbling, it need not be further subjected to the solid solution treatment. In this case, the same effect as obtained by the solid solution treatment is provided at a rate higher than that by the oven cooling. As slower cooling rate than the oven cooling rate, the stainless steel is modified and a high mechanical strength is not obtained.

After the completion of the cooling, the outer oxide layer is exfoliated. The exfoliating may be carried out by brushing, vibration method, continuous padding, or even by air blowing. The blowing is not necessarily conducted at the time after the temperature of the tube has returned to room temperature. By conducting the steam blowing or air blowing to cool the tube to room temperature – 200°C simultaneously with the completion of the heating under the steam environment, the solid solution treatment and the exfoliating of the outer oxide layer may be concurrently carried out.

The $Fe_3O_4$ layer can be removed by cooling because there occurs no strain between the base material and the outer oxide layer due to the differential coefficient of thermal expansion during the formation of the oxide coating but as cooling proceeds the differencial coefficient of thermal expansion becomes such that a resulting stress exceeds the adhesive force of the outer layer, resulting in the exfoliating of the same. Among iron-chromium stainless steels with no nickel content, those with chromium content of less than 9% cannot be used because entire layer including the anticorrosive coating is removed during cooling.

When the anticorrosive coating is formed on the boiler tube under the condition of 570°C and 250 kg/cm² over the period of 1,000 hours to 2 years, the outer oxide coating is formed in the boiler tube as stated above, but so long as the above condition is satisfied no exfoliating occurs until the temperature is lowered to around room temperature.

The relation of the heating temperature of the outer $Fe_3O_4$ layer to the exfoliating is such that below 600°C no exfoliating occurs but when heating at 650°C is maintained for more than 6 hours, exfoliating occurs. As the heating temperature increases, the exfoliating occurs in shorter heating time and the exfoliating is initiated at higher temperature.

It is thus possible to effect exfoliating by subjecting the boiler tube to the steam treatment by the steam of 571°C for a long time and then heating it to 650°C and maintaining at that temperature for six hours and subsequently cooling it to around room temperature. In this case it is advisable to concurrently conduct the air blowing or steam blowing as stated above and to cut off ends of the boiler tube to facilitate the fall down of the $Fe_3O_4$.

When the overall thickness of the scale formed in the boiler tube reaches 100 – 200 $\mu$, the outer scale layer may be exfoliated in the manner described above. For the boiler tube continuously treated by the steam of 570°C for 2 to 3 years continuously, the spinel layer grows to 50 – 100 $\mu$, while for that treated at 650°C for 1000 hours it grows to about 50 $\mu$. For new material, the ratio of the thickness of the spinel layer and that of the $Fe_3O_4$ layer is 1 : 1. Thus, if the boiler tube is maintained at this condition at 650°C for 6 hours and then cooled to room temperature, it is possible to exfoliate the scale from the entire area in the boiler tube. If the steam treatment temperatures for the boiler tube partially differ the lowest temperature may be set to 650°C in order to exfoliate the outer $Fe_3O_4$ layer from the entire surface of the boiler tube.

In the boiler tube produced according to the present invention, the amount of subsequent corrosion is reduced in inversely proportional relation to the thickness of the spinel layer. The spinel layer having the thickness of 40 $\mu$ or more can practically provide the anticorrosion effect, and above 80 $\mu$ thickness no appreciable corrosion is observed even after a long time operation. By way of actual example of the amount of the corrosion, the amount of the corrosion in the boiler tube after having been brought into contact with the steam of above 500°C under the pressure of above 200 kg/cm² for 1,000 hours is about 5 $\mu$ for the spinel layer of 60 $\mu$ thickness and nearly zero for the spinel layer of 80 $\mu$ thickness. It is thus seen an excellent anticorrosion effect is obtained.

It should be particularly noted that in spite of the exfoliating of the outer $Fe_3O_4$ layer the corrosion can be suppressed over an extended time period. It might be normally considered that by exfoliating the outer layer the metal surface would be more easily brought into contact with oxygen in the boiler water and hence the corrosion would rather be enhanced, but actually such phenomenon does not appear.

Judging from the treatment time of exfoliating the scale of the boiler, it turns out that the scale will be exfoliated in 25,000 hours (2.5 years) for the boiler which uses non-coated stainless steel boiler tube. It is generally said that it is economically payable if the boiler can be used for ten years. Accordingly, if the rate of formation of the scale is reduced to one fourth it is compatible with the economic aspect. According to the method of the present invention, the thickness of the spinel layer which allows the reduction of the rate of formation of the scale to one fourth of that for the non-coated stainless steel boiler tube is approximately 40 $\mu$.

On the other hand, since the spinel layer formed in accordance with the present invention has reached 40 – 80 $\mu$ thickness at the time of exfoliating the $Fe_3O_4$ layer, the above requirement is fully met. Furthermore, since the amount of subsequent formation of the corrosion layer progressively decreases by less than 10 $\mu$ per year and hence it takes more than ten years to reach the thickness of 50 $\mu$, no subsequent removal of the outer oxide layer is necessary.

It is thus seen that according to the present invention the corrosion of the stainless steel boiler tube which would normally occur under the high-temperature and high-pressure condition of the boiler water can be suppressed to substantially zero. In addition, the manufacture of such boiler tube is simple because the boiler tube is merely heat treated under the steam environment. The steam treatment of the boiler tube may be effected by passing the steam into the boiler tube and externally heating the boiler tube and hence the anticorrosive coating can be formed by a simple apparatus even when the boiler tube has been formed in a boiler plumbling shape.

Furthermore, if the steam blowing or air blowing is conducted immediately after the steam heating, the solid solution treatment and the exfoliating of the outer oxide layer as well as the removal thereof out of the boiler tube can be effected simultaneously with the cooling so that the process can be shortened.

The present invention will now be described with reference to the accompanying drawings.

FIG. 1 shows a cross section, in enlarged scale, of a stainless steel super heater and reheater boiler tube after having been used in operation for 2 years, in which a scale has been formed which comprises an inner spinel layer of composite oxide of iron, chromium and nickel and an outer $Fe_3O_4$ layer. The outer, rough $Fe_3O_4$ layer of the scale is exfoliated by thermal schock or the like into a plate form as shown in FIG. 3 or particle form, but the inner spinel layer of iron-chromium-nickel is not exfoliated but remains in intimate contact with a matrix.

Figure 4B:
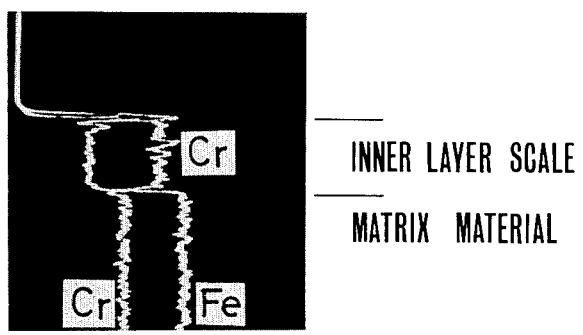
Figure 4C:
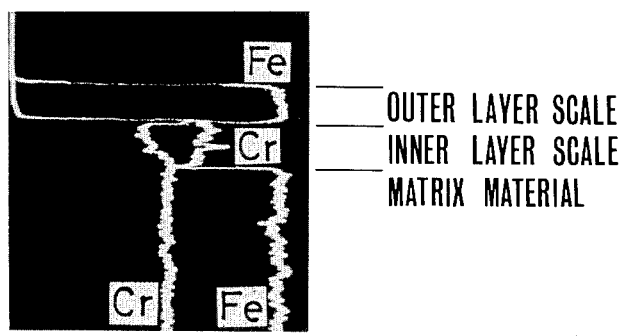

When the stainless steel of SUS 32 [AISI316 (18 Cr - 8 Ni - Mo), AISI304 (18 Cr - 8 Ni) or AISI 321 (18 Cr - 8 Ni - Ti)] is left in the steam at 1,100°C for 5 hours and then the stream of steam is stopped and quenched by nitrogen gas, the outer $Fe_3O_4$ scale layer formed by the corrosion is exfoliated around 100°C and the inner spinel oxide layer of five structured composite oxide of iron-chromium-nickel is left in intiimate contact with the matrix. A sample having only the inner oxide layer performed in the manner described above was polished obliquely so that an exposed matrix section, a thin, inner oxide layer section and a thick, inner oxide layer section were formed. FIG. 4a shows a cross section of the sample after having been corroded in the steam at 650°C and 250 kg/cm² for 1,000 hours, which is substantially equivalent to the operating condition of the boiler. As shown in FIG. 4, the exposed matrix section includes two layers consisting of a 30 $\mu$ outer layer and a 30 $\mu$ inner layer. Although the oxide layer consists of two layers even in the thin, inner oxide layer section, the thickness of the outer scale layer becomes thinner as the thickness of the inner oxide layer increases. In the thick, inner oxide layer section, no appreciable outer oxide layer was formed. The description at the bottom of FIG. 4a, shows the distribution of the thickness of the inner oxide layer prior to corrosion treatment. FIGS. 4b and 4c show the distribution of Fe and Cr at the electron probe X-ray microanalyzers 1 and 2 in FIG. 4a, in which relative amounts of Fe and Cr in the matrix are represented. Although Ni is also included in the matrix, it is omitted in the charts because the content of Ni is small and no definite lines appears Although Fe is most included in the matrix it is included in less amount in the inner oxide layer as seen in FIG. 4b. In FIG. 4c, Cr is more included than Fe in the inner oxide layer as in FIG. 4b, but Cr is not at all included in the outer oxide layer.

It is thus seen that when the inner oxide layer formed on the stainless steel boiler tube is thick the outer oxide layer which causes the exfoliating is not formed.

FIG. 5 shows the relation of the thicknesses of the inner and outer oxide layers formed at the exposed matrix section to the corrosion time. FIG. 6 shows the relation of the thickness of the inner oxide layer prior to corrosion at the cross section of FIG. 2 to the thickness of the newly formed outer oxide layer. Referring to FIG. 5, as the corrosion time elapses the thickness of the overall oxide layer increases (curve 1) and the thickness of the inner oxide layer also increases by the ampunt of about half of the overall increase (curve 2). However, as the time elapses, the rate of formation decreases. To the contrary, in FIG. 6, as the thickness of the inner oxide layer increases the thickness of the newly formed external oxide layer becomes thinner, and when the inner oxide layer is of about 50 $\mu$ thickness the amount of newly formed outer oxide layer is less than about one tenths of that formed when the inner oxide layer is not at all present. In FIG. 6, the curve 1 is for 500 hour-corrosion time while curve 2 is for 1,000 hour-corrosion time. Thus, the outer oxide layer is preferably thicker.

Figure 7:
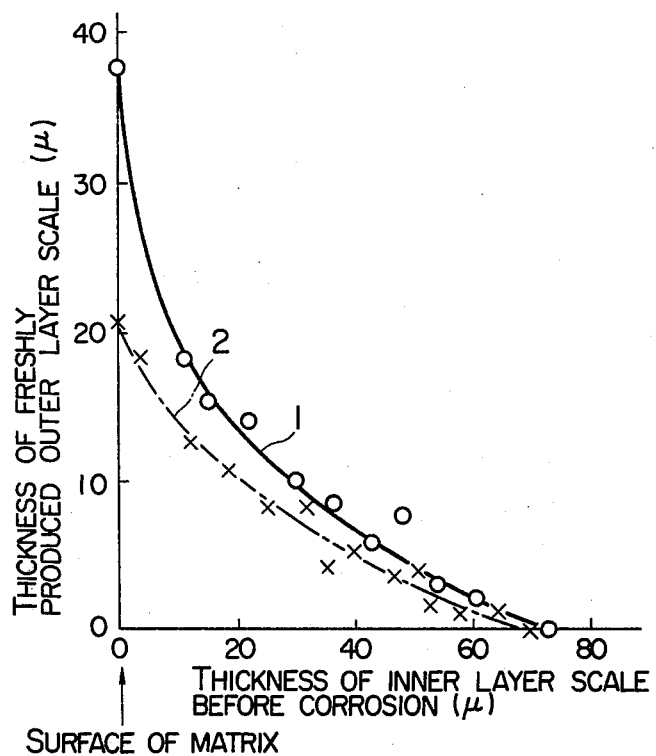

FIG. 7 shows the relation of the thickness of the inner oxide layer prior to corrosion to the thickness of the newly formed outer oxide layer where the stainless steel of SUS 29 was used instead of SUS 32 and it was corroded in the stream of the steam and nitrogen gas at 1,000°C for 5 hours, after which it was corroded in the steam at 650°C and 250 kg/cm² for 500 hours and 1,000 hours respectively. The curve 1 represents the thickness of the newly formed oxide layer of the sample corroded for 1000 hours and the curve 2 represents the thickness of the newly formed oxide layer when the sample was corroded for 500 hours. It is seen from FIG. 7 that the anticorrosive coating may be similarly formed for the stainless steels of different nickel content. Judging from the rate of formation of the scale the thickness of 45 $\mu$ for FIG. 4 and more than 37 $\mu$ for FIG. 5 will be sufficient to assure the period of more than 10 years during which the scale remains, for the reason mentioned above.

As described hereinabove, the present invention substantially suppresses the formation of the scale on the stainless steel boiler tube and considerably improves the durability of the boiler.

The table 1 shows the exfoliating condition where the steam at 571°C was passed into the stainless steel boiler tube for 35,000 hours and then the tube was sliced into rings of 15 mm width, which were again heated and maintained at elevated temperature after which they were cooled in the air. Below 600°C no exfoliating occurred. When heating was effected at 650°C for more than 6 hours, exfoliating occurred at 50°C. As the heating temperature increased, the temperature at which the exfoliating occurred slightly increased and the heating time decreased. Accordingly, if the tube is subjected to the steam heating treatment at or above 650°C and then cooled to room temperature immediately, the $Fe_3O_4$ layer is exfoliated. When the anticorrosive coating is formed by the steam treatment at 500°–600°C and 200 –300 kg/cm², the $Fe_3O_4$ layer may be removed by elevating the temperature of the steam to 650°C at 200 – 300 kg/cm² before the tube is cooled.

Table 1

| Heating Temperature (°C) | Exfoliating Condition of Scale During Cooling | | | Time required before Exfoliating occurs (h) |
|---|---|---|---|---|
| | Heating Time (h) | Exfoliating Condition | Temperature of Exfoliating (°C) | |
| 600 | 1 | 0 | — | — |
| | 6 | 0 | — | — |
| 650 | 3 | 0 | — | — |
| | 5 | Δ | 30 | 5.0 |
| | 6 | X | 50 | 5.0 |
| 700 | ¼ | 0 | — | — |
| | 1 | X | 0 | 6.0 |
| 750 | ¼ | X | 150 | 7.0 |
| 800 | ¼ | X | 200 | 7.0 |

0 no exfoliating
X full exfoliating
Δ half exfoliating

Figure 8:
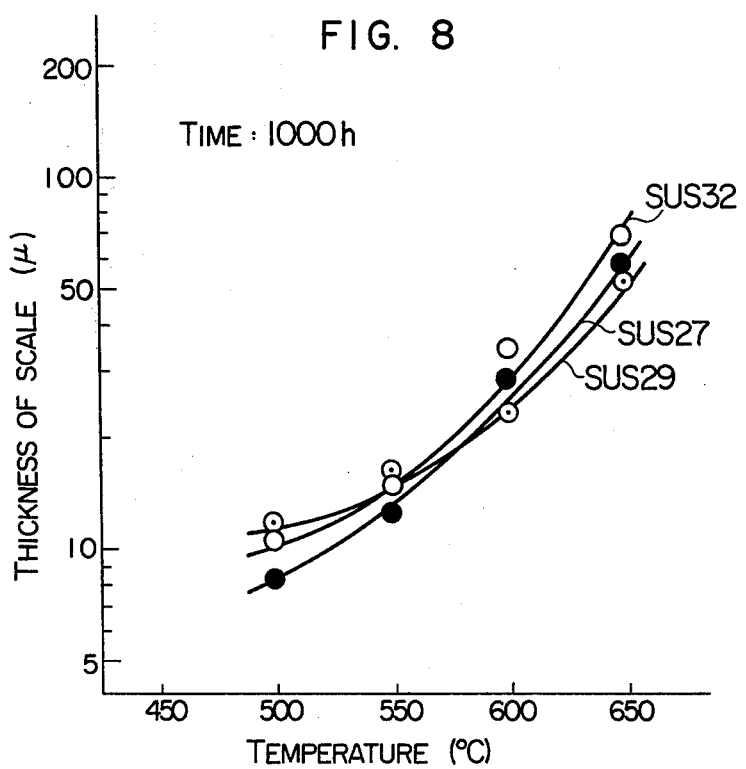
FIG. 8 shows curves illustrating the relation of the steam treatment temperature to the thickness of the resultant scale for each of the material used.

FIG. 8 shows the relation of the temperature of the steam treatment to the thickness of the overall thickness for each of different types of stainless steel. The steam treatment time was 1,000 hours. As seen from FIG. 8, although there exists a slight variation depending on the type of the stainless steel the thickness of the scale varies by the ratio of 1 : 0.5 - 0.4 between the 650°C treatment and the 600°C treatment. If the treatment continues for 2 to 3 years, the thickness of the scale will reach 100 $\mu$ under the 600°C steam treatment, and the thickness of the spinel layer of the scale will reach about 50 $\mu$. Thus it is seen that if exfoliating is effected at that point that 600°C steam treatment can be used without any problem. Even if the temperatures of the steam treatment at the center of the boiler tube and at the end thereof differ, the steam treatment may be continued until the spinel layer of 50 $\mu$ thickness is formed at the end of the tube in spite of the formation of thicker layer at the center of the tube because the exfoliating will not occur unless the temperature is lowered below 200°C as described above.

Figure 9:
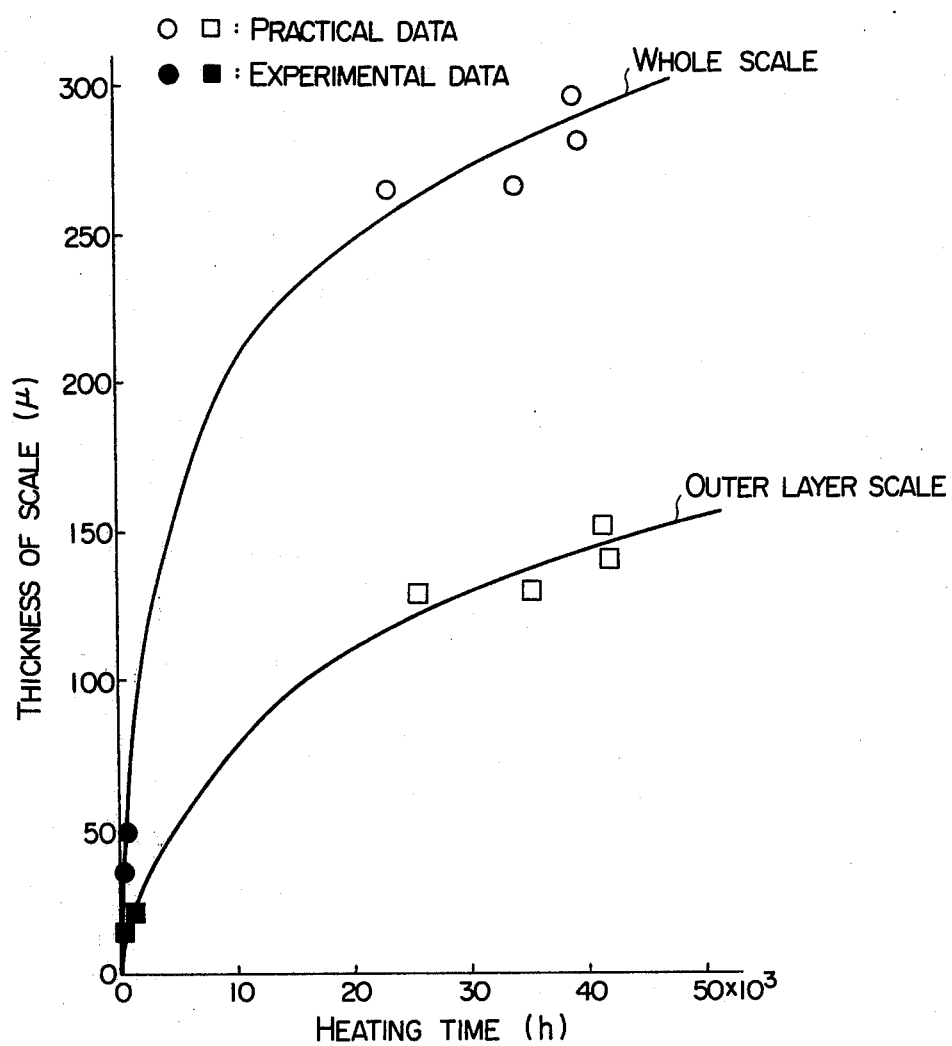
FIG. 9 shows a graph illustrating the relation of the heating time at 650°C to the thickness of the resultant scale.

FIG. 9 shows curves illustrating the relation of the steam heating time for the SUS 29 stainless steel to the thickness of the formed scale, under the steam temperature of 650°C and the pressure of 250 kg/cm$^2$, in which the relationship of FIG. 5 was applied to an actual boiler tube. As seen from FIG. 9 the spinel layer of 100 $\mu$ thickness is formed by the 650°C treatment after the elapse of 10,000 hours (slightly more than one year). Since the formation rate at 570°C is about one thirds of that at 650°C as seen from FIG. 8, it is seen that the spinel layer of more than 30 $\mu$ will be formed by the 570°C steam treatment for 1 year. Similarly, the spinel layer may be formed even under the condition of 500°C and 250 kg/cm$^2$.

What is claimed is:

1. A method for manufacturing a stainless steel boiler tube with an anticorrosive coating comprising the steps of providing a boiler tube of a stainless steel selected from iron-chromium stainless steel with a chromium content of at least 9% and iron-chromium-nickel stainless steel containing iron as a major component and chromium and nickel as minor components, heat-treating at least a inner surface of said boiler tube under a steam environment at 500° to 1,100°C. until an anticorrosive coating having a thickness of at least 40 $\mu$ is formed and subsequently removing a Fe$_3$O$_4$ layer formed on the anticorrosive coating during heat treatment of said at least the inner surface of said boiler tube by subjecting the Fe$_2$O$_3$ layer to an exfoliating treatment.

2. A method for manufacturing a stainless steel boiler tube with an anticorrosive coating according to claim 1 wherein the temperature of the heat treatment is 1,000° to 1,100°C. and the treatment is conducted until the overall thickness of the anticorrosive coating and the Fe$_3$O$_4$ layer exceeds 100$\mu$.

3. A method for manufacturing a stainless steel boiler tube with an anticorrosive coating according to claim 2 wherein the time of the heat treatment is 1,000 to 3,000 hours when the temperature of the heat treatment under the steam environment is approximately 600°C.

4. A method for manufacturing a stainless steel boiler tube with an anticorrosive coating according to claim 2 wherein the time of the heat treatment is 1 to 10 hours when the temperature of the heat treatment under the steam environment is approximately 1,000° to 1,100°C.

5. A method for manufacturing a stainless steel boiler tube with an anticorrosive coating according to claim 2 further comprising the step of cooling the stainless steel boiler tube to a room temperature after the heat treatment under the steam environment for removing exfoliated scales of said Fe$_3$O$_4$.

6. A method for manufacturing a stainless steel boiler tube with an anticorrosive coating according to claim 3 further comprising the steps of elevating the temperature of the stainless steel boiler tube above 650°C after the heat treatment under the steam environment, maintaining the boiler tube at the elevated temperature for 6 hours, and then cooling the boiler tube to a room temperature for removing exfoliated scales of Fe$_3$O$_4$.

7. A method for manufacturing a stainless steel boiler tube with an anticorrosive coating according to claim 3 further comprising the steps of passing water of 200 to 300 kg/cm$^2$ into the stainless steel boiler tube and externally heating the boiler tube so as to maintain the temperature of the steam at 500 to 650°C.

8. A method for manufacturing a stainless steel boiler tube with an anticorrosive coating according to claim 5 wherein a gas selected from air, steam and cooling gas is blown during cooling.

9. A method for manufacturing a stainless steel boiler tube with an anticorrosive coating according to claim 4 further comprising the step of cooling the stainless steel boiler tube after the steam treatment at a cooling rate higher than natural cooling rate, the temperature at which said cooling is started is approximately 1,100° to 1,000°C and the temperature at which said cooling is terminated is a room temperature.

10. A method for manufacturing a stainless steel boiler tube with an anticorrosive coating according to claim 1 wherein the Fe$_3$O$_4$ layer is removed by elevating the temperature of the stainless steel boiler tube to a temperature above 650°C. subsequent to the heat treatment, maintaining the boiler tube at the elevated temperature for 6 hours and thereafter cooling the boiler tube to a room temperature.

11. A method for manufacturing a stainless steel boiler tube with an anticorrosive coating according to claim 1 wherein the anticorrosive coating consists essentially of a spinel layer which is a composite oxide of the metals forming said stainless steel.

12. A method for manufacturing a stainless steel boiler tube with an anticorrosive coating according to claim 11 wherein said spinel is a composite oxide of nickel, iron and chromium.

13. A method for manufacturing a stainless steel boiler tube with an anticorrosive coating according to claim 11 wherein the spinel is a composite oxide of iron and chromium.

14. A method for manufacturing a stainless steel boiler tube with an anticorrosive coating according to claim 1 wherein said stainless steel consists essentially of iron, nickel and chromium.

15. A method for manufacturing a stainless steel boiler tube with an anticorrosive coating according to claim 1 wherein said stainless steel consists essentially of 5 – 25% by weight of chromium, 3 – 25% by weight of nickel and a balance of iron.

16. A method for manufacturing a stainles steel boiler tube with an anticorrosive coating according to claim 1 wherein said stainless steel is selected from a group consisting of 18 Cr stainless steel, 25 Cr stainless steel, 18 Cr - 8 Ni stainless steel, 9 Cr - 1 Mo stainless steel, 22 Cr - 12 Ni stainless steel, 13 Cr stainless steel and 25 Cr - 20 Ni stainless steel.

17. A method for manufacturing a stainless steel boiler tube with an anticorrosive coating according to claim 1 wherein the pressure of the steam is above atmospheric pressure.

18. A method for manufacturing a stainless steel boiler tube with an anticorrosive coating according to claim 1 wherein heat treatment is effected until a thickness of the anticorrosive coating is from 40 to 80$\mu$.

19. A method for manufacturing a stainless steel boiler tube with an anticorrosive coating according to claim 1 wherein the heat treatment is effected until the thickness of the anticorrosive coating is 100 $\mu$.

20. A method for manufacturing a stainless steel boiler tube with an anticorrosive coating comprising the steps of providing a boiler tube of a stainless steel selected from iron-chromium stainless steels with chromium content of at least 9%, passing water under pressure of 200 to 300 kg/cm$^2$ into said boiler tube, externally heating the boiler tube so as to maintain the temperature of the steam at 500° to 650°C, maintaining the boiler tube at the elevated temperature for 1,000 to 3,000 hours to form a coating having a spinel layer covered with a Fe$_3$O$_4$ layer, maintaining the boiler tube above 650°C for 6 hours and then cooling the boiler tube to a room temperature at a cooling rate higher than natural cooling rate to remove the Fe$_3$O$_4$ layer.

* * * * *